United States Patent [19]

Richards

[11] Patent Number: 4,691,889
[45] Date of Patent: Sep. 8, 1987

[54] JOINT CONSTRUCTION AND OVERHEAD HANGER

[76] Inventor: Peter S. Richards, 100 Mt. Si Pl., NW., Issaquah, Wash. 98027

[21] Appl. No.: 887,749

[22] Filed: Jul. 18, 1986

Related U.S. Application Data

[63] Continuation-in-part of Ser. No. 811,939, Dec. 20, 1985.

[51] Int. Cl.$^4$ .............................................. F16B 7/10
[52] U.S. Cl. ...................................... 248/343; 16/38; 403/372; 411/33
[58] Field of Search .................... 248/317, 74.1, 188.9, 248/188.5, 188, 188.7, 58, 59, 70, 343; 403/372, 260, 370, 245; 411/33, 34, 35, 103; 16/38, 39

[56] References Cited

U.S. PATENT DOCUMENTS

| | | | |
|---|---|---|---|
| 1,031,462 | 7/1912 | Paine . | |
| 1,736,722 | 11/1929 | Newman . | |
| 1,753,183 | 4/1930 | Johnson | 16/39 |
| 1,768,505 | 6/1930 | Carr . | |
| 2,190,555 | 2/1940 | Toce et al. | 287/20 |
| 2,281,279 | 4/1942 | Fox | 67/23 |
| 2,730,419 | 1/1956 | Watrous | 248/188 |
| 2,798,748 | 7/1957 | Maurer | 287/52 |
| 2,922,455 | 1/1960 | Braendel | 151/41.7 |
| 2,950,937 | 8/1960 | Bedford, Jr. | 287/126 |
| 2,972,495 | 2/1961 | Yalen | 287/54 |
| 3,009,747 | 11/1961 | Pitzer | 308/71 |
| 3,135,033 | 6/1964 | Jackson | 24/122.3 |
| 3,271,056 | 9/1966 | Frisbey, Jr. | 287/20.92 |
| 3,355,201 | 11/1967 | Barwick | 287/119 |
| 3,506,227 | 4/1970 | Jenkins | 248/59 |
| 3,633,862 | 1/1972 | Breen | 248/251 |
| 3,779,659 | 12/1973 | Habert | 403/372 |
| 4,033,222 | 7/1977 | Wilson | 411/33 |
| 4,134,703 | 1/1979 | Hinners | 403/104 |
| 4,147,458 | 4/1979 | Elders | 411/33 |
| 4,573,652 | 3/1986 | Richards | 248/74.1 |

FOREIGN PATENT DOCUMENTS

| | | | |
|---|---|---|---|
| 483979 | 6/1952 | Canada | 411/33 |
| 668912 | 4/1950 | United Kingdom . | |
| 2061365 | 5/1981 | United Kingdom | 411/33 |

Primary Examiner—Reinaldo P. Machado
Assistant Examiner—Alvin Chin-Shue
Attorney, Agent, or Firm—Delbert J. Barnard

[57] ABSTRACT

A support leg (14) is attached to a ceiling structure (10) by means of a threaded stud (12) which mates with a threaded opening (18) in an insert (16) which is swage connected to the upper end of the support leg (14). A flat bar (20) is attached to the lower end of the support leg (14) so that it extends horizontally and makes a "T" with the support leg (14). An expansion clamp assembly (22) is carried by the bar (20). This assembly (22) is plugged into the tubular lower end portion (24) of the support leg (14). The uppermost part of the assembly (22) is a T-nut (48). The head (50) of the nut (48) includes a plurality of struck out barbs (76) having points (74) which penetrate into and grip the inner sidewall of the socket (24) when the assembly (22) is inserted into the socket (22). This secures the nut (48) against rotation. Following insertion, the member (20) is rotated, relative to the support leg (14), causing a relative endwise movement of a threaded rod (30), carried by the member (20), into the nut (48). This movement causes a cam surface (40) on a cam member (36) to be moved against wings (58) on one or more lock washers (54), in a direction deflecting the wings (58) outwardly. This deflection moves the edges of the wings (58) into a tight displacing engagement with the inner wall of the socket (24). Rotation of member (20) is continued until the member (20) is securely fastened to the support leg (14).

20 Claims, 9 Drawing Figures

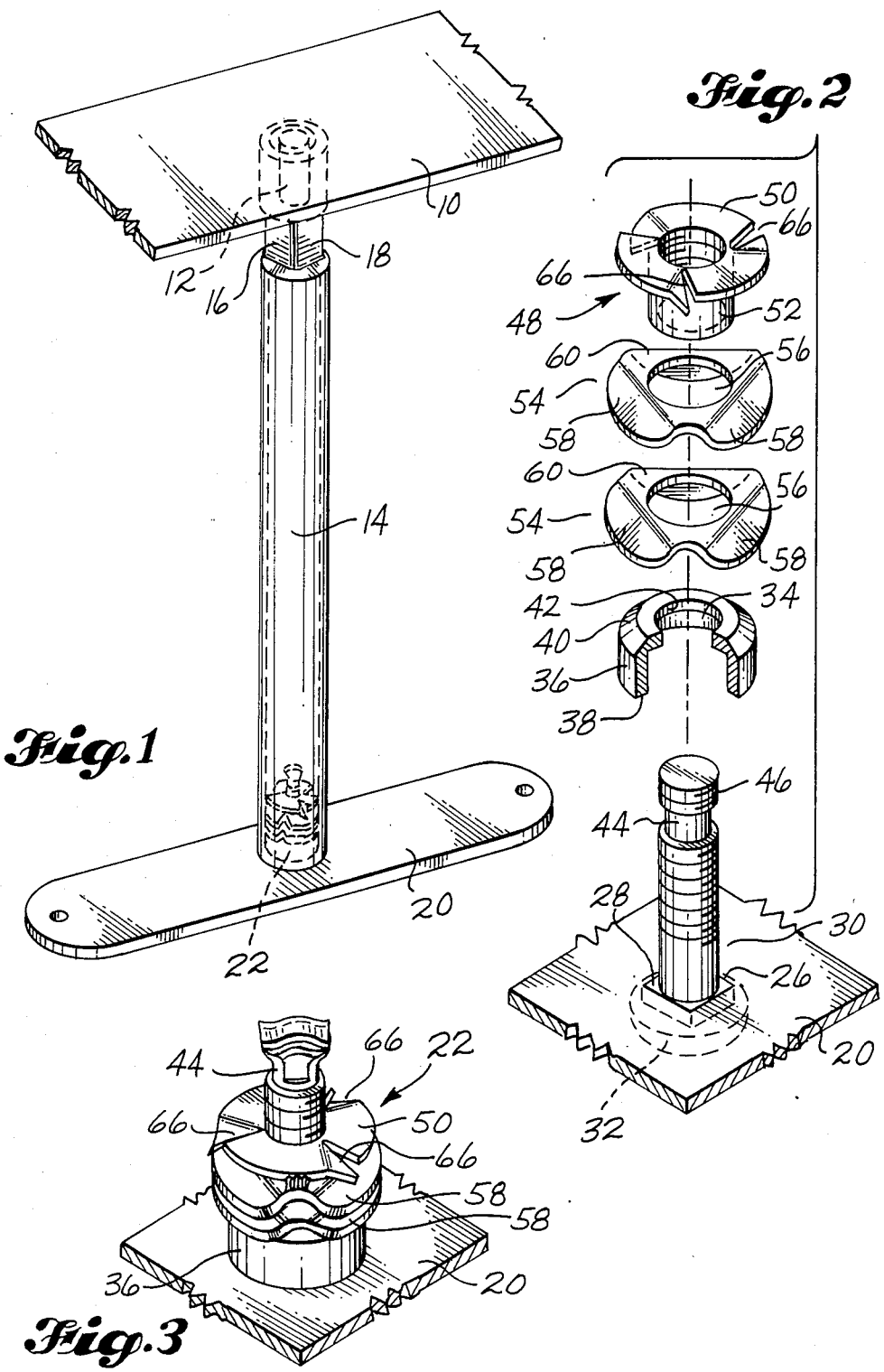

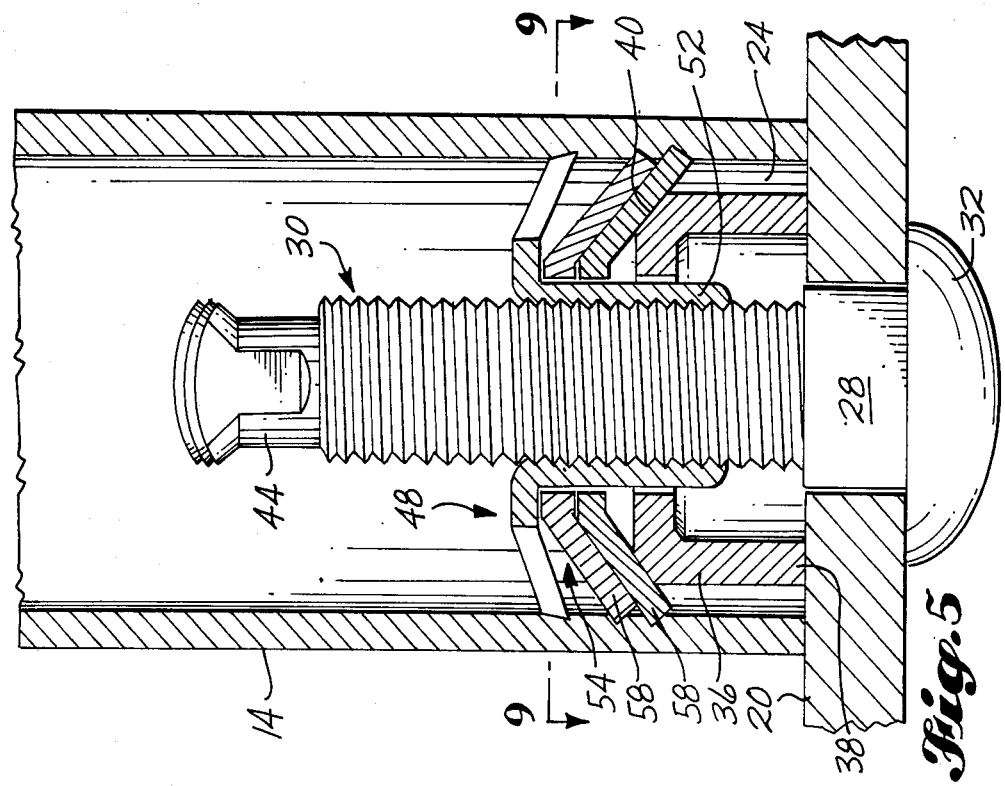
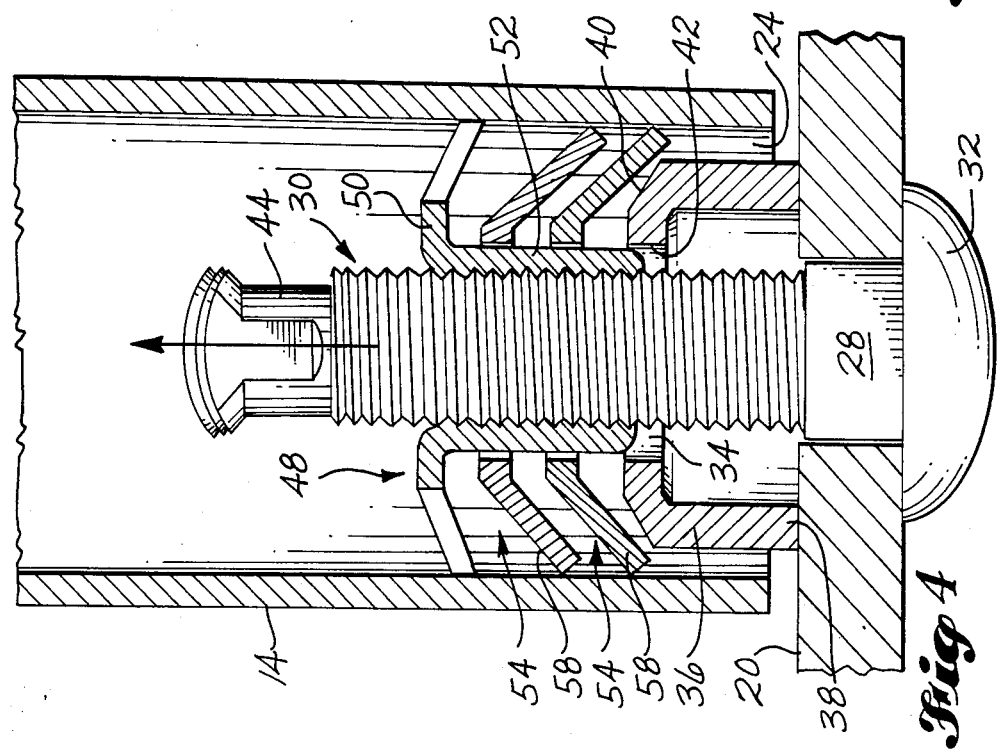

JOINT CONSTRUCTION AND OVERHEAD HANGER

RELATED APPLICATION

This application is a continuation-in-part of Ser. No. 811,939, filed Dec. 20, 1985 and entitled Overhead Hanger and Joint Construction.

DESCRIPTION

1. Technical Field

This invention relates to a joint construction between two members, one of which includes a socket, and in particular to a joint construction including an expansion connector assembly carried by the other member that is merely plugged into the socket and then rotated, to provide a strong and firm connection between the two members.

2. Background Art

The general concept of an expansion connector is old. This type of connector comprises a first part which is in the nature of an insert and a second part which includes a socket for the insert. The insert is inserted into the socket and expanded to exert a clamping or holding force on the wall of the socket.

Examples of expansion connectors which can be found in the patent literature are shown by the following U.S. Pat. No. 2,190,555, granted Feb. 13, 1940, to Charles A. Toce, Robert F. Broussard and William N. Woodruff; U.S. Pat. No. 2,281,279, granted Apr. 28, 1942, to David A. Fox; U.S. Pat. No. 2,798,748, granted July 9, 1957, to Albrecht Maurer; U.S. Pat. No. 3,009,747, granted Nov. 21, 1961, to Kenneth H. Pitzer; U.S. Pat. No. 3,135,033, granted June 2, 1964, to Samuel H. Jackson; U.S. Pat. No. 3,355,201, granted Nov. 28, 1967 to Leroy E. Barwick; U.S. Pat. No. 3,779,659, granted Dec. 18, 1973 to Roger Habert; and U.S. Pat. No. 4,134,703, granted Jan. 16, 1979, to Earl S. Hinners.

The mechanisms disclosed by these patents should be carefully considered for the purpose of putting the present invention into proper perspective relative to the prior art.

The present invention relates to the provision of a new and unique joint construction comprising a first member which includes an expansion insert. The insert is merely slipped endwise into a socket carried by the second member, and then one of the members is simply rotated relative to the other, and the insert functions to dig into the wall of the socket and in that manner securely connect the two members together.

Another object of the invention is to provide an improved mounting structure for a suspended object (e.g. a lighting fixture) which utilizes the joint construction, and which makes it possible for the user to disassemble and then later reassemble the mounting structure, without the use of destructive methods (e.g. removing parts by use of metal cutting equipment).

Ship construction is done in stages. Quite often, a component is installed and then it is discovered that the component must be removed in order to either install another component, or perform some other stage of the construction of the ship. Light fixtures must be securely affixed to the ceiling structure and this has in the past been done by welding the upper ends of support leg members to the ceiling and welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the parts of the mounting structure to each other and to the ceiling structure, so that if it becomes necessary to remove the mounting structure, it can be done without destructive affects to this component, so that such component can be reused. The mounting structure of the present invention makes it easy to raise or lower a lighting fixture or similar object. The mounting structure need only be disassembled and then reassembled with a longer or shorter support leg.

DISCLOSURE OF THE INVENTION

In basic form the joint construction of the present invention comprises a first member which includes a cylindrical sidewall defining a socket having an inner surface, and a second member which includes a connector assembly that plugs into the socket. The connector assembly comprises a threaded rod projecting from the second member and having a base and a free end. A cam member is located at the base of the rod. The cam member has a base end and an opposite end. The cam member is smaller in diameter than the inside diameter of the socket. The cam member includes a camming portion at its opposite end. At least one locking disk is provided. The locking disk (or disks) has a center opening through which the rod extends. It also has a plurality of wings spaced around the disk and bent to extend toward the cam portion of the cam member. The locking disk has a plan form size to allow the locking disk to slip fit into the socket. A nut is threaded onto the threaded portion of the rod, axially outwardly of the locking disk. The nut includes a plurality of peripheral barbs with pointed ends. The nut includes a plan form dimension which in the region of the pointed ends of the barbs is larger than the inner diameter of the socket. In accordance with the invention, the first and second members are connected together by firstly a movement of the connector assembly on the second member into the tubular socket of the first member. Such first movement causes a force fit of the pointed ends of the barbs into the socket, attended by the pointed ends penetrating into and gripping the inner surface of the socket, to hold the nut against rotation. The second movement is a tightening rotation of the second member relative to the first member. During this rotation the points of the barbs connect the nut to the first member while allowing relative axial travel of the nut on the threaded rod towards the cam member. The axial travel of the cam member causes the cam portion of the cam member to push the wings of the locking disk outwardly, so as to press the edges of the wings into tight penetrating engagement with the inner surface of the socket.

In preferred form, the nut comprises a thin, washer-like head portion and a tubular body portion connected to the head portion. The tubular body portion extends axially towards the cam member. The locking disk has a center opening through which the tubular portion of the nut extends. The peripheral barbs are struck out barbs at the periphery of the head of the nut.

In preferred form, the head of the nut has a relatively flat general plane which extends perpendicular to the axis of the threaded rod. A plurality of tangential slots are formed in the head. Each barb borders one of the slots. Each barb is bent out of the general plane of the head of the nut towards the second member. The pointed ends of the barbs are directed to make penetrating contact with the inner surface of the cylindrical sidewall of the socket in response to nut loading during tightening rotation of the second member relative to the first member.

Also in preferred form, the cam member includes a central opening having an edge with which the threaded rod defines an annular space around the rod, between it and the edge. The tubular portion of the nut extends into this annular space during tightening rotation of the second member relative to the first member.

In accordance with another aspect of the invention, a joint construction of the type described above is provided at the lower end of a support leg. The connector assembly is a part of a frame member which is connected to the lower end of the support leg. The upper end of the support leg is connected to an overhead structure, such as a ceiling, or the like. In preferred form, this mounting structure is used for suspending an object from the overhead of a ship. The upper end of the support leg is secured to a portion of the ceiling and the frame member is attached to the lower end of the support leg, in the manner described above.

Also in preferred form, the upper end of the support leg is provided with a screw connection between it and a base member that is connected to the ceiling. This construction allows the mounting structure to be easily and quickly removed without injury to the components of the mounting structure.

Other more detailed features of the invention are described below in connection with the description of the illustrated embodiment.

BRIEF DESCRIPTION OF THE DRAWINGS

Like reference numerals are used to designate like parts throughout the several views of the drawings, and:

FIG. 1 is an isometric view of a mounting structure of a type which may advantageously utilize the connector assembly of the present invention, such view being taken from above and to one side of the mounting structure, and including a fragmentary portion of a ceiling panel to which the upper end of the mounting structure is secured;

FIG. 2 is an exploded isometric view of an embodiment of the connector assembly of the present invention;

FIG. 3 is an isometric view of the connector assembly of FIG. 2 in an assembled condition, prior to insertion of the connector assembly into a socket at the end of a support leg portion of the connector assembly;

FIG. 4 is an axial section view at the lower end of the support leg, showing the connector assembly in the process of being moved upwardly into the socket;

FIG. 5 is a view like FIG. 4, but of a final assembled condition;

BEST MODE FOR CARRYING OUT THE INVENTION

Figures 6, 7:
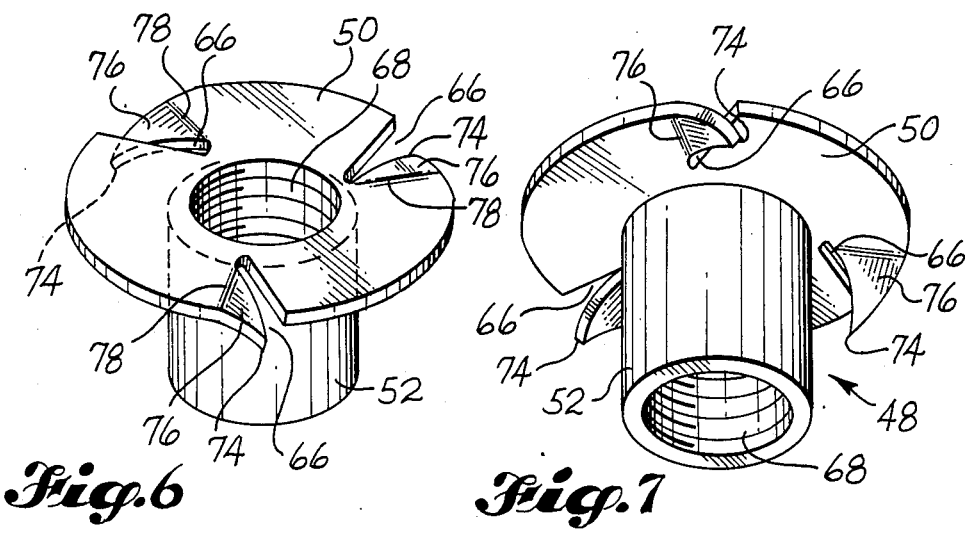
FIG. 6 is an isometric view of a grip nut, taken from above and looking down onto the top and one side of the nut.
FIG. 7 is another isometric view of the grip nut, taken from below and looking towards the bottom and opposite side of the nut.

The joint construction of the present invention may be advantageously utilized in a support of the type shown by FIG. 1.

Referring to FIG. 1, a member 10 (e.g. a ceiling panel) may be provided with a downwardly extending threaded stud 12, sized to be inserted into the upper end of a mounting leg 14, into threaded engagement with internal threads provided in such upper end (not shown). The upper end portion of the mounting leg may be formed to provide a section which includes at least one pair of opposed wrench flats 16, 18. The mounting leg 14 and the other parts of the support are described in greater detail in my aforementioned application Ser. No. 811,939.

A flat, elongated bar 20 is provided at the lower end of leg 14. Bar 20 carries a connector assembly 22 which can be easily moved endwise into the tubular lower end portion 24 of the support leg 14.

In preferred form, bar 20 includes a center opening 26 which is square in shape and is sized to receive the square portion 28 of a carriage type bolt 30. Bolt 30 includes a head 32 which is positioned on the lower side of bar 20 (as pictured).

The shank portion of bolt 30 extends upwardly through a center opening 34 in a cam member 36. In preferred form, the cam member 36 is in the nature of a ring and it has a base end 38 and an opposite end. In use base end 38 contacts member 20. Cam surface 40 is provided at the opposite end of cam member 36. Camp surface 40 may be in the nature of a chamfer which extends completely around the circumference of the member 36.

Opening 34 is defined by an edge 42 which in use closely surrounds the shank of the bolt 30.

The shank portion of the bolt 30 is threaded. Preferably, the threads extend downwardly into the cam member 36. A non-threaded neck 44 (FIG. 2) may be formed adjacent the free end of the bolt 30. A threaded portion 46 may be provided endwise outwardly of the neck 44.

In accordance with the invention, the connector assembly includes a nut 48 having a head portion 50 and a tubular body portion 52. The head portion 50 has a general plane which extends perpendicular to the axis of the bolt 30. The tubular body portion 52 of the nut 48 is connected at one of its end to the head 50 and extends therefrom axially of the bolt 30.

Nut 48 is a modified tee or flange nut. It is similar to the nut disclosed by U.S. Pat. No. 2,632,355, granted Mar. 24, 1953, to Phillip D. Becker. The difference lies in the construction and function of the flange portion of the nut, herein termed the "head" of the nut.

In accordance with the invention, one or more locking disks 54 are stacked on the shank portion of the bolt 30. By way of typical and therefore nonlimiting example, two locking disks 54 are shown in the illustrated embodiment. The locking disks 54 have circular openings 56 at their centers through which the threaded shank portion of the bolt 30 extends, and also through which the tubular body portion 52 of the nut 48 extends.

The locking disks 54 have winged portions which are bent down at an angle to a flat central portion. By way of example, each locking disk 54 may include three wings 58 bent down from a flat central portion 60. Each wing 58 forms a dihedral with the flat central portion 60. The outer edges 62 of the wings 58 may be plain, as illustrated, or may be serrated. In any event, the edges 62 lie on a circle which is generated from the center 64 of the opening 56. This circle is either slightly smaller than, slightly larger than or equal in diameter to the inside diameter of socket forming portion 24 of the support leg 14. If the circle is slightly larger in diameter than the inside diameter of the socket the difference is small enough that it does not prevent easy endwise insertion of the connector assembly into the socket 24. Preferably, the edges 62 lie on a circle which is either substantially equal to or slightly less than the diameter of the socket.

Figures 8, 9:
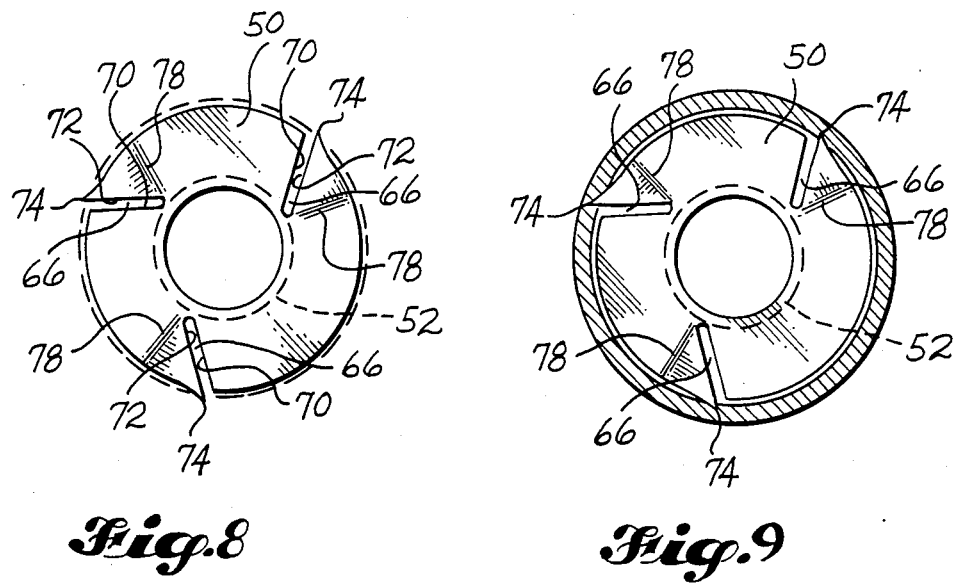
FIG. 8 is a top plan view of the connector assembly, prior to its insertion into the socket.
FIG. 9 is a sectional view taken substantially along line 9—9 of FIG. 5 showing the assembly inside the socket and showing the barbs on the grip nut penetrating into the sidewall of the socket.

As best shown by FIG. 8, a plurality of slots 66 are formed in the head 50 of the nut 48. These slots 66 extend generally at a tangent from the center opening 68. A first side boundary 70 of each slot 66 forms an obtuse angle with the periphery of the head 50. The opposite side boundary 72 forms an acute angle with the periphery of the head 50. This acute angle is in the neighborhood of thirty degrees (30°) and results in the formation of a relatively sharp point 74 where the slot boundary 72 meets the periphery of the head 50. The regions of the head 50 that are between the slot boundaries 72 and the periphery of the head 50 may be termed barbs. These barbs 76 are bent downwardly at an angle, about fold lines 78. Fold lines 78 may be radial lines. These barbs 76 may be bent down at an acute angle of about thirty degrees (30°), for example.

Prior to the slots 66 being cut and the barbs 76 being bent down, the head 50 of the nut 48 is of a diameter substantially equal to or slightly smaller than the diameter of the socket 24. The cutting of the slots 66 and the bending of the barbs 76 downwardly function to move the points 74 of the barbs 76 outwardly so that they now lie on a circle which is slightly larger in diameter than the socket 24. As a result, the head 50 of nut 48 must be forced into the socket 24. This forcing causes the points 74 to dig into the inner surface of the socket 24.

As will hereinafter be described in more detail, the barbs 76 are directed such that the points 74 will tend to dig into the sidewall material of the socket 24 in response to a tightening rotation of the bolt 30 relative to the nut 48.

As illustrated, the wings 58 of the lower locking disk 54 make contact with the cam surface 40. The wings 58 of the next locking disk 54 make contact with the wings 58 of the first locking disk 54. That is, the two (or more) locking disks 54 nest together and are stacked on the cam surface 40.

The connector assembly is assembled as follows. The bolt 30 is inserted through the square hole 26 and moved to place the square portion 28 of the bolt 30 snugly within the square hole 26, and place the bolt head 32 up against the lower surface of the bar member 20. The cam member 36 is slipped over the shank of the bolt 30. The locking disks 54 are placed on the bolt 30 and are stacked on the cam surface 40 and the nut 48 is screwed onto the threaded portion of bolt 30. As shown by FIG. 5, nut 48 is screwed down until its tubular portion 52 has extended through the openings 56 and into the opening 42 and the bolt head 50 is in contact with the uppermost locking disk 54. Preferably, an edge portion of the head 50 is spot welded to the uppermost locking disk 59 at an edge location of disk 54 between the wings 58. This is done for the purpose of securing the nut 48 to the upper locking disk 54, so that these members will always rotate together. The nesting arrangement of the uppermost locking disk 54 with the locking disks 54 or disk 54 below it will cause all of the disks 54 to rotate with the nut 48. The location of the spot weld between the wings 58 of the upper disk 54 and in the undisturbed region of flange 50 prevents this connection from interferring in any way with the outward and upward movement of the wings, and/or the wall engaging movement of the barbs, during tightening rotation of the bolt 30 into the nut 48.

Following tightening of the nut 48 to contact or near contact with the stack of locking disks 54, the upper end portion 48 of the shank bolt 30 is squeezed, so as to flatten it. This is done to render the upper threads inoperative and prevent removal of the nut 48 off from the bolt 30, The creation of the neck region 44 prevents the distortion of the end portion 48 from disturbing the threads below the neck portion 48. Of course, there are a number of ways in which the upper end of the bolt 30 can be treated in order to prevent unwanted removal of the nut 48 from the bolt 30.

Following assembly of the connector assembly parts onto the bar 20, the connector assembly is moved into the open end of the socket 24 and pushed or tapped upwardly. As described above, the barbs 76 must be bent somewhat and/or the points 74 must cut into the sidewall material in the socket 24, in order for the connector assembly to move upwardly into the socket 24. This movement may sometimes be accomplished by hand force. At other times a hammer can be used to tap on the head 32, for moving the members 14, 20 together, and the connector assembly up into the socket 24 until the lower end surface of the member 14 contacts the upper surface of the bar 20. Following such contact, the bar 20 is rotated in a direction causing the threads on the shaft of the bolt 30 to travel into the nut 48. Any rotational torque transmitted by the threads of the bolt 30 to the threads of the nut 48 is transmitted to the nut 48 and functions to move the points 74 of the barbs 76 into tighter penetrating contact with the sidewall material of the socket 24. This digging in of the points 74 of the barbs 76 prevents the nut 48 from rotating, i.e. it effectively connects it to the member 14. During further rotation of the bar 20, the nut 48 and the bar 20 are drawn relatively together. This causes a squeezing force to be applied to the stack of locking disks 54. The contact of the cam surface 40, with the locking disks 54, and the difference in slope between the cam surface 40 and the wings 58 of the locking disks 54 causes an upward swinging movement of these wings 58. As these wings 58 move their edges penetrate into the sidewall material of the socket 24. After a few turns of the bar 20, the engagement of the edges of the wings 58 with the sidewall of the socket 24 is so tight and secure that additional rotation becomes difficult. At this time the rotational force is removed and the member 20 is quite securely connected to the member 14.

As shown by FIG. 4, the slope of the wings 58 of the locking disks 54 is initially greater than the slope of the cam surface 40. As a result, a line contact is made between the radially outer boundary of the cam surface 40 and the adjacent under surface of the first locking disk 54. As the cam surface 40 and the wing's under surfaces extend radially inwardly from the line of contact, they also diverge apart. As a result, when the bolt 30 is screwed relatively into the nut 48, the contacting region of the cam surface 40 with the first locking disk 54 exerts an axial force on the wings 58 of the locking disk 54. This acts to swing the wings 58 upwardly. The upper peripheral edges of the wings 58 have to move into the sidewall material of the socket 24, in order for such movement to occur. Also, the wings 58 of the lower locking disk 54 exert a force on the wings 58 of the locking disk or disks 54 above it, pushing it or them in the same direction. In other words, it swings them upwardly and moves their upper peripheral edges into biting engagement with the sidewall material in the socket 24.

The connector assembly may also be referred to as an "expansion mechanism." The expansion mechanism of this invention does not involve a mere "friction" fit. The points 74 of the barbs 76 and the edges of the wings 58 actually penetrate the socket wall material. There is a galling action. The wings deform and displace the wall material and dig progressively further into the socket wall as the withdrawal force is increased.

The joint construction formed between members 14 and 20 has utility in other installations. Member 20 can take any one of a plurality of different forms. It can itself be a tubular member. The tubular portion or socket 24 may be a tubular end portion of an otherwise nontubular member.

In accordance with established rules of patent interpretation, the embodiment that has been illustrated and described has been submitted by way of example only. The scope of protection provided by the patent is to be determined by the following claims, and by the doctrine of equivalents.

What is claimed is:

1. A joint construction comprising:
   a first member including a cylindrical sidewall defining a socket having an inner surface;
   a second member;
   a connector assembly on said second member, said connector assembly comprising a threaded rod projecting from said second member and having a base and a free end;
   a cam member at the base of the rod having a base end and an opposite end, said cam member being smaller in diameter than the inside diameter of said socket, said cam member including a camming portion at its opposite end;
   at least one locking disk having a center opening through which the threaded rod extends, and a plurality of wings spaced around the disk and bent to extend towards the caming portion of the cam member, said locking disk having a plan form sized to allow the locking disk to slip fit into said socket;
   a nut threaded onto the threaded portion of the rod axially outwardly of the locking disk, said nut having a thin washer-like head portion and a tubular body portion connected to the head portion and extending axially towards the cam member through the center opening in the locking disk, and a plurality of peripheral barbs with pointed ends, wherein said peripheral barbs are struck out barbs at the periphery of the head of the nut said nut having a plan form dimension which in the region of the pointed ends of the barbs is larger than the inner diameter of the socket; and
   wherein the first and second members are connected together by firstly a movement of the connector assembly on the second member into the tubular socket of the first member, such first movement causing a force fit of the pointed ends of the barb into the socket, attended by such pointed ends penetrating into and gripping the inner surface of the socket and holding the nut against rotation, and secondly by a tightening rotation of the second member relative to the first member, wherein the points of the barbs connect the nut to the first member during such rotation while allowing relative axial travel of the nut on the threaded rod towards the cam member, such axial travel causing the cam portion of the cam member to push the wings of the locking disk outwardly, so as to press the edges of the wings into tight penetrating engagement with the inner surface of the socket.

2. A joint construction according to claim 1, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

3. The joint construction according to claim 1, wherein the cam member includes a central opening having an edge with which the threaded rod defines an annular space around the rod, between it and the edge, into which the tubular portion of the nut extends during tightening rotation of the second member relative to the first member.

4. A joint construction according to claim 3, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

5. A joint construction according to claim 1, wherein the threaded rod is a shank portion of a bolt, and said second member includes an opening through which the shank of the bolt extends, and said bolt has a head which bears against the side of the second member that is opposite the first member, and the cam member is positioned against the side of the second member that is directed towards the first member, and the cam member includes a central opening through which the shank portion of the bolt extends.

6. A joint construction according to claim 5, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

7. The joint construction according to claim 5, wherein the cam member includes a central opening having an edge with which the threaded rod defines an annular space around the rod, between it and the edge, into which the tubular portion of the nut extends during tightening rotation of the second member relative to the first member.

8. A joint construction according to claim 7, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

9. A joint construction according to claim 1, comprising means connecting the nut to the locking disk so that the two of them are fixed together, but without interferring with the ability of the wings of the locking disk to move in response to camming action of the cam portion of the cam member during rotation of the second member relative to the first member.

10. A joint construction according to claim 9, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

11. The joint construction according to claim 10, wherein the cam member includes a central opening having an edge with which the threaded rod defines an annular space around the rod, between it and the edge, into which the tubular portion of the nut extends during tightening rotation of the second member relative to the first member.

12. A joint construction according to claim 11, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

13. A joint construction according to claim 1, comprising a plurality of locking disks of the type described.

14. A joint construction according to claim 13, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

15. The joint construction according to claim 14, wherein the cam member includes a central opening having an edge with which the threaded rod defines an annular space around the rod, between it and the edge, into which the tubular portion of the nut extends during tightening rotation of the second member relative to the first member.

16. A mounting structure for a suspended object, comprising:
a support leg member having a lower end socket defined by a cylindrical sidewall having an inner surface;
a frame member including a connector assembly, said connector assembly comprising
a threaded rod projecting from said second member and having a base and a free end;
a cam member at the base of the rod having a base end and an opposite end, said cam member being smaller in diameter than the inside diameter of said socket, said cam member including a camming portion at its opposite end;
at least one locking disk having a center opening through which the threaded rod extends, and a plurality of wings spaced around the disk and bent to extend towards the cam portion of the cam member, said locking disk having a plan form sized to allow the locking disk to slip fit into said socket;
a nut threaded onto the threaded portion of the rod axially outwardly of the locking disk, said nut having a thin washer-like head portion and a tubular body portion connected to the head portion and extending axially towards the cam member through the center opening in the locking disk, and a plurality of peripheral barbs with pointed ends, wherein said peripheral barbs are struck out barbs at the periphery of the head of the nut, said nut having a plan form dimension which in the region of the pointed ends of the barbs is larger than the inner diameter of the socket; and
wherein the first and second members are connected together by firstly a movement of the connector assembly on the second member into the tubular socket of the first member, such first movement causing a force fit of the pointed ends of the barb into the socket, attended by such pointed ends penetrating into and gripping the inner surface of the socket and holding the nut against rotation, and secondly by a tightening rotation of the second member relative to the first member, wherein the points of the barbs connect the nut to the first member during such rotation while allowing relative axial travel of the nut on the threaded rod towards the cam member, such axial travel causing the cam portion of the cam member to push the wings of the locking disk outwardly, so as to press the edges of the wings into tight penetrating engagement with the inner surface of the socket.

17. A structure according to claim 16, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

18. A structure according to claim 16, wherein the threaded rod is a shank portion of a bolt, and said second member includes an opening through which the shank of the bolt extends, and said bolt has a head which bears against the side of the second member that is opposite the first member, and the cam member is positioned against the side of the second member that is directed towards the first member, and the cam member includes a central opening through which the shank portion of the bolt extends.

19. A structure according to claim 16, wherein the cam member includes a central opening having an edge with which the threaded rod defines an annular space around the rod, between it and the edge, into which the tubular portion of the nut extends during tightening rotation of the second member relative to the first member.

20. A structure according to claim 19, wherein the head of the nut has a relatively flat general plane which extends perpendicular to the axis of the threaded rod, and a plurality of tangential slots, with each barb bordering one of said slots, each said barb bending out of the general plane of the head of the nut towards the second member, with the pointed ends of the barbs being directed to make penetrating contact with the inner surface of the cylindrical sidewall of the socket in response to nut loading during tightening rotation of the second member relative to the first member.

* * * * *